US012725100B2

(12) United States Patent
Okada et al.

(10) Patent No.: US 12,725,100 B2
(45) Date of Patent: Sep. 1, 2026

(54) DEVICE FOR ASSISTING WITH WORK PLANNING AND METHOD FOR ASSISTING WITH WORK PLANNING

(71) Applicant: KOBELCO CONSTRUCTION MACHINERY CO., LTD., Hiroshima (JP)

(72) Inventors: Satoshi Okada, Tokyo (JP); Tomotaka Mitani, Tokyo (JP); Nobuhiro Takamatsu, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 100 days.

(21) Appl. No.: 18/562,011

(22) PCT Filed: Mar. 1, 2022

(86) PCT No.: PCT/JP2022/008621

§ 371 (c)(1),
(2) Date: Nov. 17, 2023

(87) PCT Pub. No.: WO2022/244375

PCT Pub. Date: Nov. 24, 2022

(65) Prior Publication Data

US 2024/0256996 A1 Aug. 1, 2024

(30) Foreign Application Priority Data

May 21, 2021 (JP) ................................ 2021-086524

(51) Int. Cl.
*G06Q 10/0631* (2023.01)
*G06Q 50/08* (2012.01)

(52) U.S. Cl.
CPC ......... *G06Q 10/0631* (2013.01); *G06Q 50/08* (2013.01)

(58) Field of Classification Search
CPC ........................... G06Q 10/0631; G06Q 50/08
See application file for complete search history.

(56) References Cited

U.S. PATENT DOCUMENTS 8,095,346 B2 1/2012 Fukuda et al.
2009/0192772 A1 * 7/2009 Fukuda .................. G06Q 10/06 703/6

(Continued)

FOREIGN PATENT DOCUMENTS

CA 3229285 A1 * 3/2023 ........... E21C 35/282
JP 2009-169777 A 7/2009

(Continued)

OTHER PUBLICATIONS

Khodabandelu "Improving Multi-Crane Planning on Construction Sites" (2023)(https://digitalscholarship.unlv.edu/thesesdissertations/4889/) (Year: 2023).*

(Continued)

*Primary Examiner* — Sujay Koneru
(74) *Attorney, Agent, or Firm* — Oblon, McClelland, Maier & Neustadt, L.L.P.

(57) ABSTRACT

There is provided a system and the like capable of reducing effects of how much knowledge/experience a user has and making it easy for the user to decide a work plan by a crane. A user who sees a primary work situation image output to a terminal output interface can grasp a space occupation aspect of a building and an arrangement aspect of a plurality of candidate carriage points determined based on first factors specified through a terminal input interface. A user who sees a secondary work situation image output to the terminal output interface of an information terminal can grasp an arrangement aspect of first carriage points to which it is possible to carry a material by a crane for which an arrangement aspect and specifications thereof are specified based on (Continued)

second factors specified through the terminal input interface, while avoiding interference with the building.

7 Claims, 8 Drawing Sheets

(56) References Cited

U.S. PATENT DOCUMENTS

| | | | | |
|---|---|---|---|---|
| 2016/0034608 | A1* | 2/2016 | Delplace | B66C 13/46 703/1 |
| 2019/0094834 | A1* | 3/2019 | Bramberger | G09B 9/04 |
| 2020/0407201 | A1* | 12/2020 | Windbacher | B66C 23/76 |
| 2021/0221654 | A1* | 7/2021 | Yodawara | B66C 13/40 |
| 2022/0284366 | A1* | 9/2022 | Kelly | B66C 13/18 |
| 2022/0324679 | A1* | 10/2022 | Benzing | G01S 17/08 |
| 2023/0059205 | A1* | 2/2023 | Prupes | G06Q 10/0832 |
| 2023/0401356 | A1* | 12/2023 | Tago | G06F 30/20 |

FOREIGN PATENT DOCUMENTS

| | | | |
|---|---|---|---|
| JP | 2020-194426 | A | 12/2020 |
| JP | 2021-22020 | A | 2/2021 |
| KR | 10-2018-0055130 | A | 5/2018 |
| WO | WO 2021/049112 | A1 | 3/2021 |

OTHER PUBLICATIONS

Extended European Search Report issued Sep. 17, 2024, in corresponding European Patent Application No. 22804296.6, 8 pages.
International Search Report issued May 31, 2022 in PCT/JP2022/008621 filed on Mar. 1, 2022, 2 pages.

* cited by examiner

20
INFORMATION TERMINAL
21
TERMINAL INPUT INTERFACE
22
TERMINAL OUTPUT INTERFACE
24
TERMINAL CONTROL DEVICE
NETWORK
102
20
20
20
10
WORK PLANNING ASSISTANCE SERVER
11
FIRST PLANNING ASSISTANCE PROCESSING COMPONENT
12
SECOND PLANNING ASSISTANCE PROCESSING COMPONENT

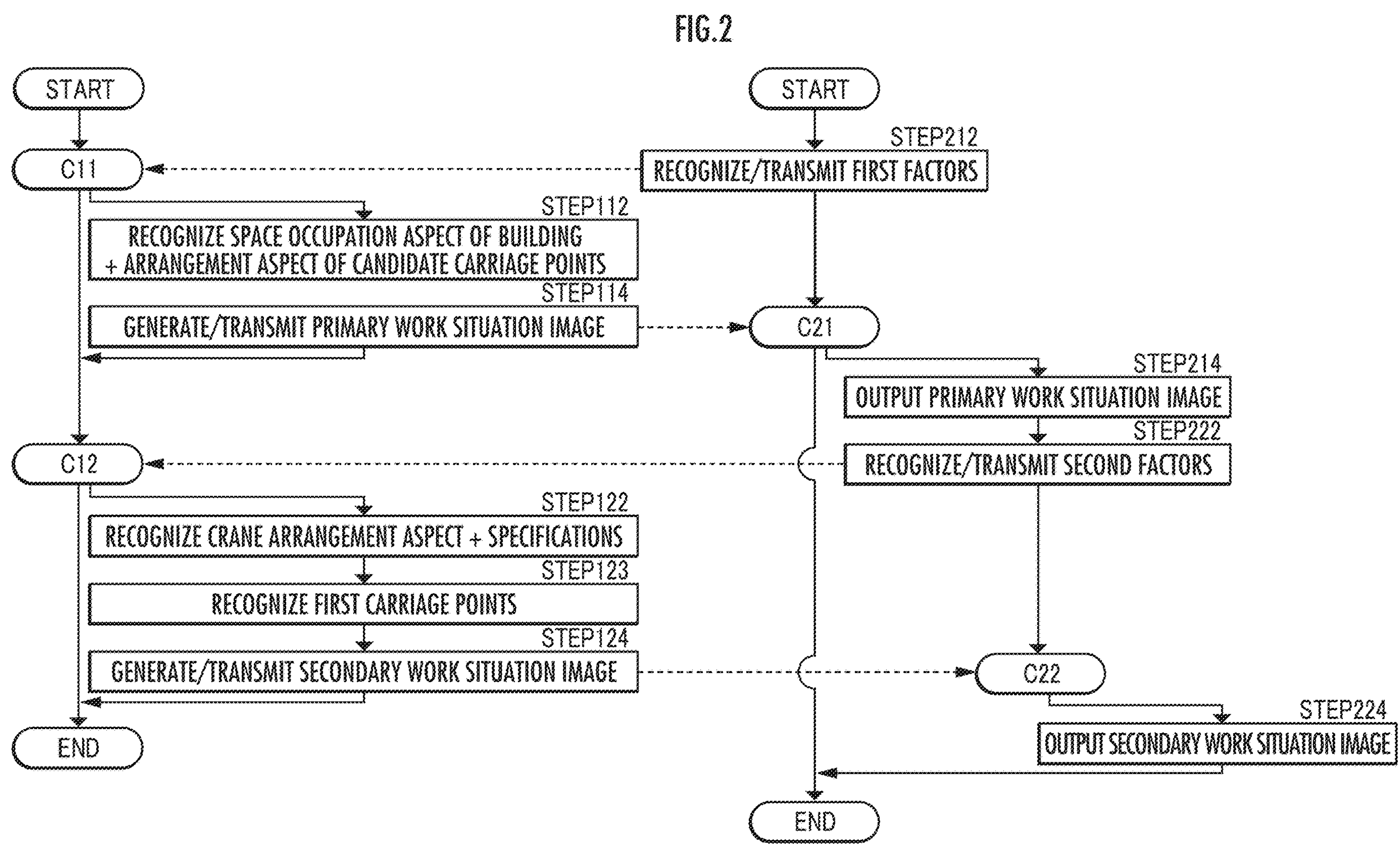
FIG.2
START
C11
STEP112
RECOGNIZE SPACE OCCUPATION ASPECT OF BUILDING + ARRANGEMENT ASPECT OF CANDIDATE CARRIAGE POINTS
STEP114
GENERATE/TRANSMIT PRIMARY WORK SITUATION IMAGE
C12
STEP122
RECOGNIZE CRANE ARRANGEMENT ASPECT + SPECIFICATIONS
STEP123
RECOGNIZE FIRST CARRIAGE POINTS
STEP124
GENERATE/TRANSMIT SECONDARY WORK SITUATION IMAGE
END
START
STEP212
RECOGNIZE/TRANSMIT FIRST FACTORS
C21
STEP214
OUTPUT PRIMARY WORK SITUATION IMAGE
STEP222
RECOGNIZE/TRANSMIT SECOND FACTORS
C22
STEP224
OUTPUT SECONDARY WORK SITUATION IMAGE
END

FIG.4

Q
P
M
CRANE SPECIFICATIONS
●●‥
Z
Y
X

DEVICE FOR ASSISTING WITH WORK PLANNING AND METHOD FOR ASSISTING WITH WORK PLANNING

TECHNICAL FIELD

The present invention relates to a technique for assisting with planning of work accompanied by work of carrying a load suspended by a crane.

BACKGROUND ART

There is proposed a technique for, in a work simulation system for plant construction, reflecting a content of evaluation/analysis on specification inputs by a user and making adjustments so that a content of the specification inputs is included within an input range among set value input units that are mutually related, in order to realize improvement of efficiency of whole construction work (see, for example, Patent Literature 1).

CITATION LIST

Patent Literature

Patent Literature 1: Japanese Patent Laid-Open No. 2009-169777

SUMMARY OF INVENTION

Technical Problem

According to difference m knowledge and/or experience among users, there may be a case where it is not easy to decide a work plan, including where around a building which crane with which performance is to be arranged.

Therefore, an object of the present invention is to provide a system and the like capable of reducing effects of how much knowledge/experience a user has and making it easy for the user to decide a plan for work by a crane.

Solution to Problem

A device for assisting with work planning of the present invention comprises:

a first planning assistance processing component configured to, based on first factors specified through an input interface, recognize a space occupation aspect of a building and an arrangement aspect of a plurality of candidate carriage points, generate a primary work situation image indicating the space occupation aspect of the building and the arrangement aspect of the plurality of candidate carriage points, and cause the primary work situation image to be output to an output interface; and a second planning assistance processing component configured to recognize, based on second factors specified through the input interface, an occupiable area of a crane and a material according to an arrangement aspect of the crane, recognize, based on the space occupation aspect of the building, the arrangement aspect of the plurality of candidate carriage points, and the occupiable area of the crane and the material, candidate carriage points to which it is possible to carry the material by the crane while avoiding interference of each of the crane and the material with the building as first carriage points, generate a secondary work situation image, the secondary work situation image being the primary work situation image with the first carriage points and second carriage points, which are candidate carriage points other than the first carriage points, being expressed in an identifiable form, and cause the secondary work situation image to be output to the output interface.

According to the device for assisting with work planning in the above configuration, it is possible to cause a user who sees the primary work situation image output to the output interface to grasp the space occupation aspect of the building and the arrangement aspect of the plurality of candidate carriage points determined based on the first factors specified through the input interface. Thereby, it is possible to cause the user to take a guess where the crane is to be arranged, in consideration of the space occupation aspect of the building and the arrangement aspect of the plurality of candidate carriage points.

Furthermore, it is possible to cause the user who sees the secondary work situation image output to the output interface to grasp an arrangement aspect of the first carriage points to which it is possible to carry the material by the crane while avoiding interference of the crane and the material with the building, with the arrangement aspect and specifications of the crane being specified based on the second factors specified through the input interface. Each of the first carriage points may be a point where carriage of the material ends or a point where carriage of the material starts. Thereby, it is possible to cause the user to confirm the second factors determining the arrangement aspect and the specifications of the crane, and thus appropriateness of a work plan including selection of specifications of the crane defined by the second factors, in consideration of the arrangement aspect of the first carriage points. Therefore, it is possible to reduce effects of how much knowledge/experience the user has and make it easy for the user to decide a work plan for the crane.

BRIEF DESCRIPTION OF DRAWINGS

FIG. 2 is a flowchart indicating functions of the device for assisting with work planning.

FIG. 4 is a diagram about the primary work situation image (a bird's-eye image).

DESCRIPTION OF EMBODIMENTS (Configuration)

Figure 1:
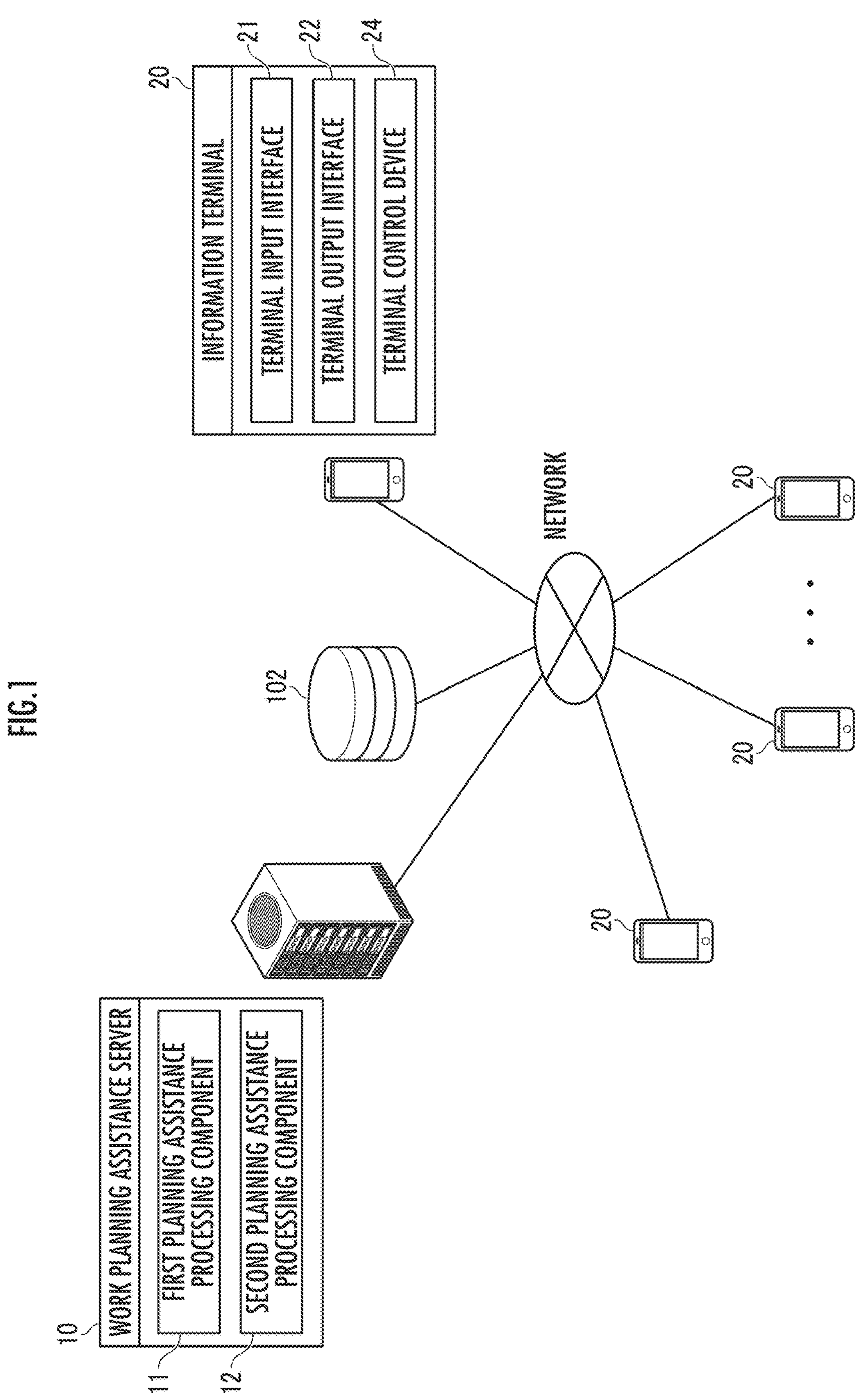
FIG. 1 is a configuration diagram of a device for assisting with work planning as one embodiment of the present invention.

A device for assisting with work planning as one embodiment of the present invention shown in FIG. 1 is configured with a work planning assistance server 10 that is capable of mutually communicating with each of information terminals 20 and a database server 102 via a network. The work planning assistance server 10 includes a first planning assistance processing component 11 and a second planning assistance processing component 12. Each of the first planning assistance processing component 11 and the second planning assistance processing component 12 is configured with an arithmetic processing device (a CPU, a processor core, or the like) and a storage device (memories such as a ROM and a RAM). It is designed that the arithmetic processing device reads necessary data and/or a program (software) from the storage device and executes arithmetic processing as described later according to the program for the data.

The database server 102 constitutes a database that stores and holds data required for work planning by each information terminal 20, such as data indicating a spatial arrangement aspect of a building and a crane in a virtual space. The database server 102 may be a component of the work planning assistance server 10.

Each information terminal 20 shown in FIG. 1 is configured with a smartphone, a tablet terminal, a personal computer, or a beacon. As shown in FIG. 1, the information terminal 20 includes a terminal input interface 21, terminal output interface 22 and a terminal control device 24. The terminal input interface 21 is configured with capacitance-type touch buttons constituting a touch panel. The terminal output interface 22 is configured with an acoustic output device and, furthermore, wireless communication equipment in addition to an image display device constituting the touch panel. A specification signal is transmitted to the outside of the information terminal 20 by the wireless communication equipment. A terminal control device 24 is configured with an arithmetic processing device (a CPU, a processor core, or the like) and a storage device (memories such as a ROM and a RAM).

(Functions)

Functions of a remote operation assistance system and an image pickup function control system by the above components will be described, using a flowchart shown in FIG. 2. In the flowchart, each block indicated by "C*" is used for simplification of description, means transmission and/or reception of data, and means such a conditional branch that a process in a branch direction is executed on condition of transmission and/or reception of the data.

In any of the information terminals 20, first factors specified through the terminal input interface 21 are recognized by the terminal control device 24 and transmitted to the work planning assistance server 10 (FIG. 2/STEP 212). The "first factors" are factors for identifying a specified work situation model, which is one work situation model among a plurality of different work situation models. Each work situation model is defined by a space occupation aspect of a building and arrangement aspect of candidate carriage points in a virtual space. Each work situation model may be defined by the landform of a point around a building where a crane may be arranged. Each situation model may be defined by a space occupation aspect of vehicles and/or workers coming and going on a site. At this time, a terminal identifier for identifying the information terminal 20 is also transmitted to the work planning assistance server 10.

When the first factors are received by the work planning assistance server 10 (FIG. 2/C11), a specified work situation model according to the first factors, and thus a space occupation aspect of a building and an arrangement aspect of a plurality of candidate carriage points in a virtual space, which define the specified work situation model, are recognized by the first planning assistance processing component 11 (FIG. 2/STEP 112).

Figure 3:
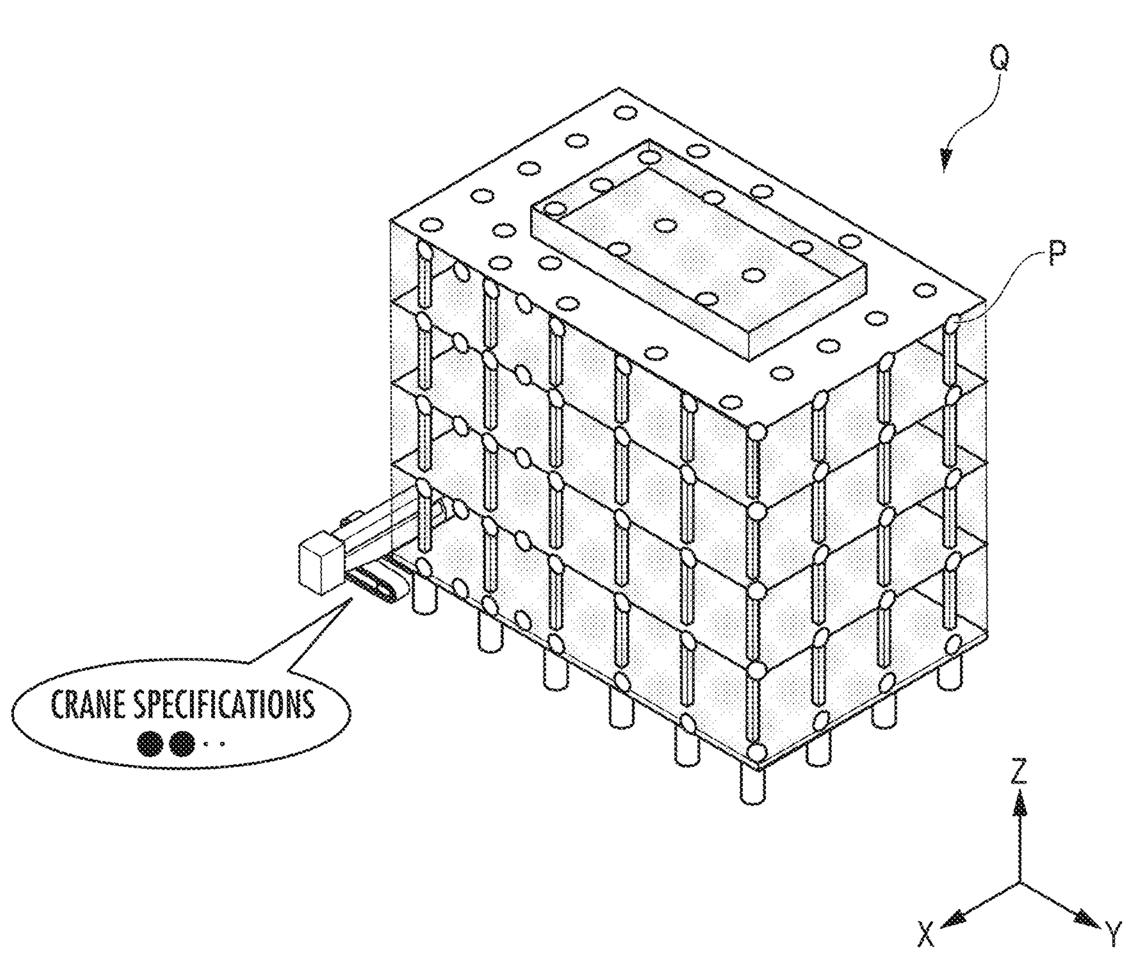
FIG. 3 is a diagram about a primary work situation image (a perspective image).
Figure 4:
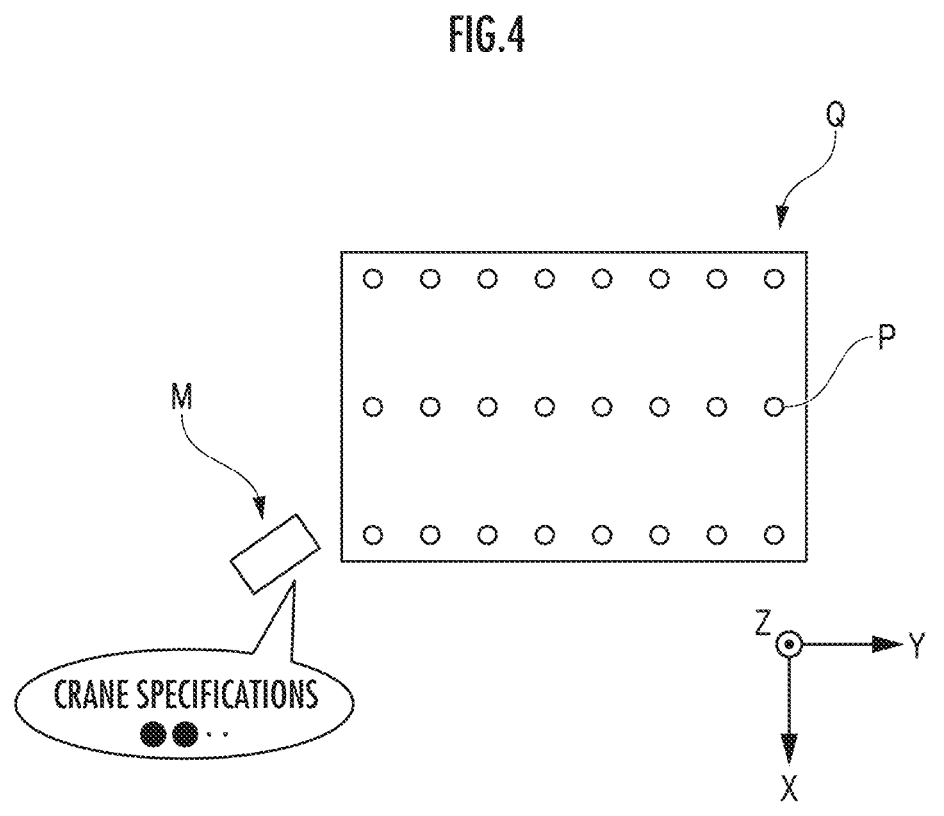

According to the work situation model, for example, in a virtual space in which coordinate values (X, Y, Z) are defined by a three-dimensional Cartesian coordinate system, which is shown in FIGS. 3 and 4, a space occupation aspect of an substantially rectangular parallelepiped building Q is defined by a three-dimensional area $\{X, Y, Z | X_1 \leq X \leq X_2, f_1(X) \leq Y \leq f_2(Y), g_1(X, Y) \leq Z \leq g_2(X, Y)\}$. Here, $f_1$ and $f_2$ are functions (for example, linear functions) of a main variable X for defining an aspect of spread of the building Q in a Y direction; and $g_1$ and $g_2$ are functions of main variables X and Y for defining an aspect of spread of the building Q in a Z direction. Further, as shown in FIGS. 3 and 4, a plurality of candidate carriage points P in the virtual space are distributedly arranged on top and side parts of the building Q. The candidate carriage points P are defined by coordinate values (x, y, z) of points or a two-dimensional or three-dimensional area that spreads based on the reference points.

Next, a primary work situation image indicating a space occupation aspect of the building Q and an arrangement aspect of the plurality of candidate carriage points P in the virtual space are generated and transmitted to the information terminal 20 by the first planning assistance processing component 11 (FIG. 2/STEP 114).

When the primary work situation image is received by the information terminal 20 (FIG. 2/C21), the primary work situation image is output to the terminal output interface 22 by the terminal control device 24 (FIG. 2/STEP 214). Thereby, a perspective image as shown in FIG. 3 and/or a bird's-eye image as shown in FIG. 4 is output to the terminal output interface 22 as the primary work situation image indicating the space occupation aspect of the building Q and the arrangement aspect of the plurality of candidate carriage points P in the virtual space.

In the information terminal 20, second factors specified through the terminal input interface 21 are recognized by the terminal control device 24 and transmitted to the work planning assistance server 10 (FIG. 2/STEP 222). The "second factors" are factors for specifying an arrangement aspect and specifications of a crane M (or a base M0 thereof) in the virtual space that defines the work situation model. For example, coordinate values of the crane M and a unit vector indicating a direction of the crane M around the building Q in the virtual space, and specifications including a rated total load of the crane M, a size of an attachment M1, and the like correspond to the second factors. At this time, the terminal identifier for identifying the information terminal 20 is also transmitted to the work planning assistance server 10.

When the second factors are received by the work planning assistance server 10 (FIG. 2/C22), the arrangement aspect of the crane M in the virtual space and the specifications according to the second factors are recognized by the second planning assistance processing component 12 (FIG. 2/STEP 122).

Figure 5:
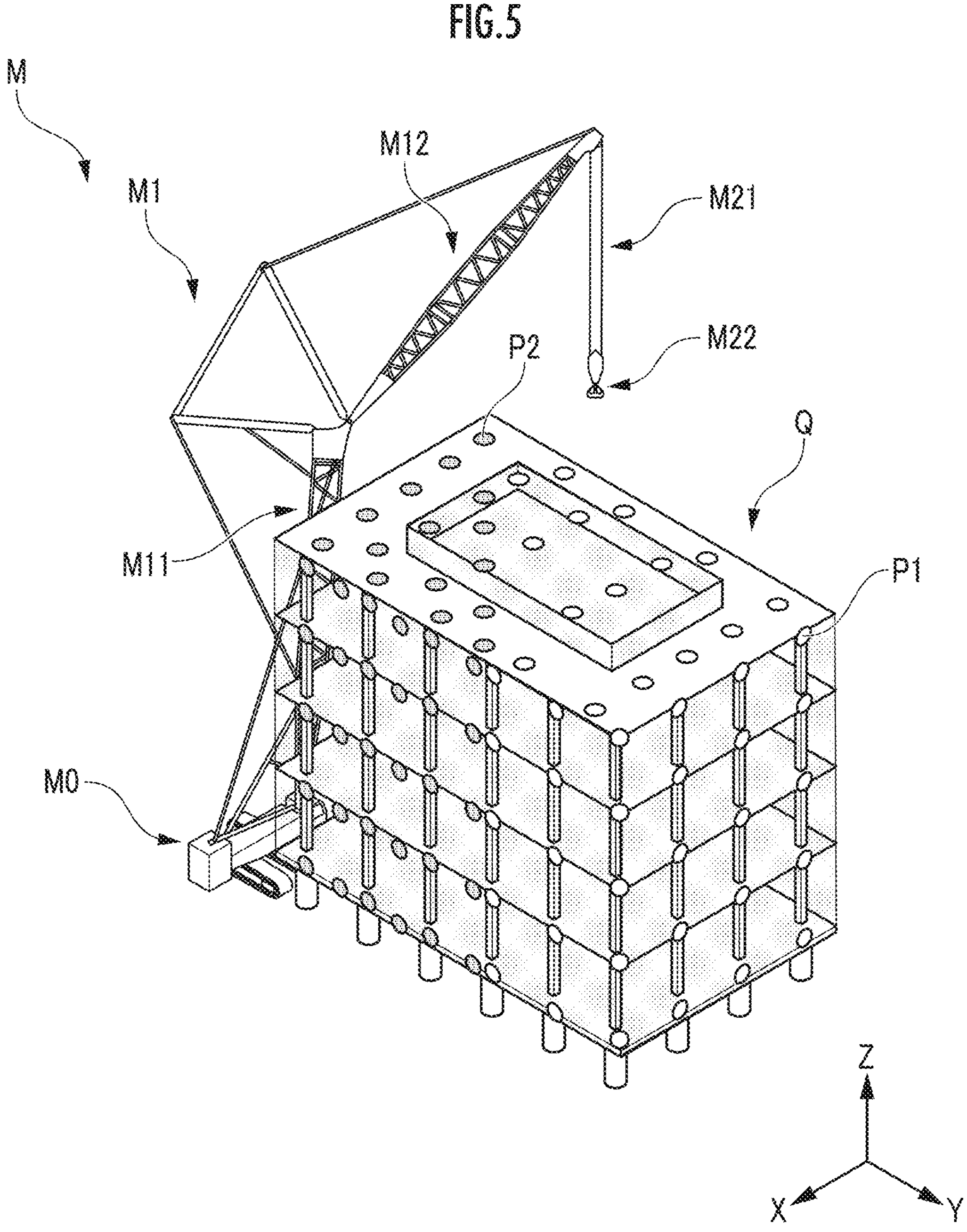
FIG. 5 is a diagram about a secondary work situation image (a perspective image).
Figure 6:
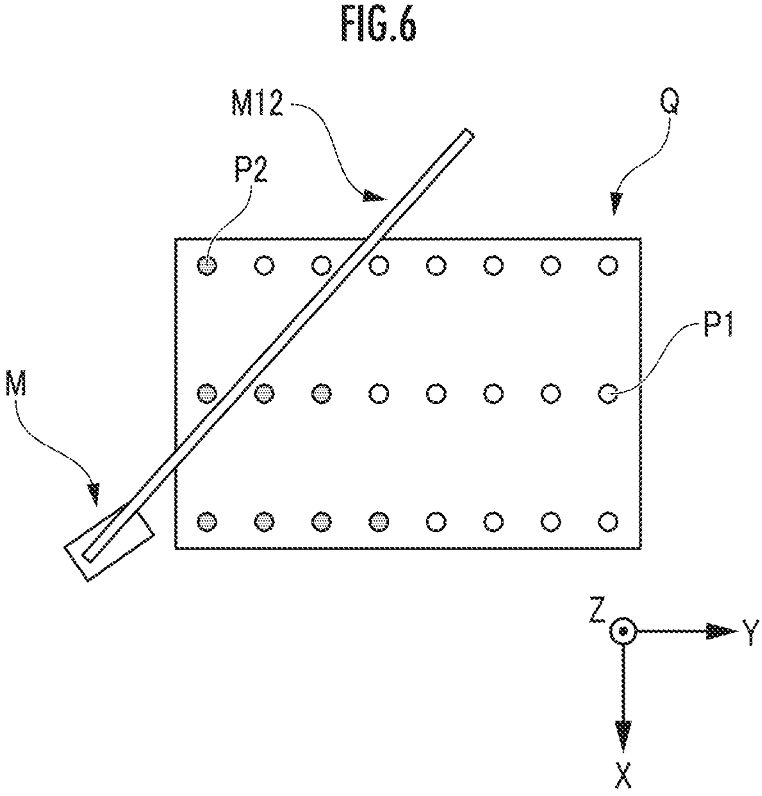
FIG. 6 is a diagram about the secondary work situation image (a bird's-eye image).

For example, in a virtual space in which coordinate values (X, Y, Z) are defined by a three-dimensional Cartesian coordinate system, which is shown in FIGS. 5 and 6, a position and a direction (a unit vector indicating the direction) of the base M0, which is a component of the crane M, are recognized as an arrangement aspect of the crane M. A shape and a size of each of a boom M11 and a jib M12 constituting the base M0 and the attachment M1, tolerance ranges of a turning angle $\phi$ and an elevation angle $\theta$1 of the boom M11, a tolerance range of an elevation angle $\theta$2 of the jib M12, a winding limit of a hook M22 suspended from the attachment M1 via a wire M21, and the like are recognized as the specifications of the crane M. The hook M22 may include a main hook suspended from a tip part (for example, a boom point sheave) of the boom M11 and/or an auxiliary hook suspended from a tip part (for example, a jib point sheave) of the jib M12.

The tolerance range (an upper-limit height and a lower-limit height) of a height above sea level of a highest reaching part of the crane M is determined by the tolerance range of each of the elevation angles θ1 and θ2. When a structure of the crane M is different, however, the tolerance range (the upper-limit height and the lower-limit height) of the height above sea level of the highest reaching part of the crane M may be determined by the tolerance range of a quantity of state determining a position and/or a posture of a movable part of the crane M.

In the virtual space, for example, the base M0 is defined as a rectangular parallelepiped; each of the boom M11 and the jib M12 is defined as a quadrangular prism or a cylinder, a wire M21 is defined as a line; and the hook M22 is defined as a point. The shape and the size of the hook M22 may be defined to encompass a size of a material to be carried.

The crane M may be selected from among cranes with various specifications by the second factors being specified through the terminal input interface 21. The crane M may be a mobile crane such as a crawler crane or a wheel crane (a tire traveling crane, a rough terrain crane, a truck crane, or all terrain crane) or may be a stationary crane such as a jib crane, a climbing crane, or a tower cane. In addition to the tower crane, the crane M may be a luffing crane or a fixed jib crane. The crane M may have a boom, a jib, a mast and/or a strut as attachments. The boom may be a lattice boom in addition a Telesco (registered trademark) (telescopic) boom.

Next, candidate carriage points P to which it is possible to carry the material by the crane M while avoiding interference of each of the crane M and the material (or the hook M22) with the building Q are recognized by the second planning assistance processing component 12 as first carriage points P1 (FIG. 2/STEP 123).

Specifically, from a material carriage start point P0=(X0, Y0, Z0) to a candidate carriage point P=(X, Y, Z) (or from the candidate carriage point P=(X, Y, Z) to a carriage end point P0=(X0, Y0, Z0)), a change aspect of the position of the hook M22 and/or the material is decided as a material position trajectory such that the change aspect does not overlap with the building Q. Further, such a time series or change aspect of each of an turning angle ϕ and the elevation angle θ1 of the boom M11, the elevation angle θ2 of the jib M12, and a length of the wire M21 that realizes the material position trajectory is decided as a crane posture trajectory according to inverse kinematics. At this time, the crane posture trajectory is tentatively decided such that each of the tuning angle ϕ and elevation angle θ1 of the boom M11, the elevation angle θ2 of the jib M12, and the length of the wire M21 is not out of the tolerance range. For example, the tolerance range of each of the elevation angle θ1 of the boom M11 and the elevation angle θ2 of the jib M12 may be determined based on the upper-limit height position of a top edge (an upper limit value of Z-coordinate value) of the crane M and/or the attachment M1.

Next, a time series or change aspect of a space occupation aspect of the crane M, and thus the attachment M1 (and the wire M21) which are components of the crane M are decided based on the crane posture trajectory. Then, if the time series of the space occupation aspect of the crane M does not overlap with the building Q, candidate carriage points P corresponding to the time series of the space occupation aspect of the crane M are recognized as the first carriage points P1. On the other hand, if the time series of the space occupation aspect of the crane M overlaps with the building Q, candidate carriage points P corresponding to the time series of the space occupation aspect of the crane M is recognized as second carriage points P2.

For example, the plurality of candidate carriage points P shown in FIGS. 3 and 4 are classified into the first carriage points P1 (see white circles) and the second carriage points P2 (see black circles) as shown in FIGS. 5 and 6.

Then, a secondary work situation image, which is the primary work situation image with the first carriage points P1 and the second carriage points P2 being expressed in an identifiable form, is generated and transmitted to the information terminal 20 by the second planning assistance processing component 12 (FIG. 2/STEP 126).

When the secondary work situation image is received by the information terminal 20 (FIG. 2/C22), the secondary work situation image is output to the terminal output interface 22 by the terminal control device 24 (FIG. 2/STEP 224). Thereby, a perspective image shown in FIG. 5 and/or a bird's-eye image shown in FIG. 6 is output to the terminal output interface 22 as the secondary work situation image, which is the primary work situation image indicating the space occupation aspect of the building Q and the arrangement aspect of the plurality of candidate carriage points P in the virtual space, with the first carriage points P1 (see the white circles) and the second carriage points P2 (see the black circles) being identifiable.

Operation and Effects

According to the work planning assistance server 10 (the device for assisting with work planning) that performs the functions described above, it is possible to cause a user who sees the primary work situation image output to the terminal output interface 22 of the information terminal 20 to grasp the space occupation aspect of the building Q and the arrangement aspect of the plurality of candidate carriage points P determined based on the first factors specified through the terminal input interface 21 of the information terminal 20 (see FIG. 2/STEP 212→C11→STEP 112→STEP 114→C21→STEP 214, and FIGS. 3 and 4). Thereby, it is possible to cause the user to take a guess where the crane M is to be arranged, in consideration of the space occupation aspect of the building Q and the arrangement aspect of the plurality of candidate carriage points P.

Furthermore, it is possible to cause the user who sees the secondary work situation image output to the terminal output interface 22 of the information terminal 20 to grasp the arrangement aspect of the first carriage points P1 to which it is possible to carry the material by the crane M while avoiding interference of the crane M and the material with the building Q, with the arrangement aspect and the specifications of the crane M being specified based on the second factors specified through the terminal input interface 21 (see FIG. 2/STEP 222→C12→STEP 122→STEP 124→STEP 126→C22→STEP 224, and FIGS. 5 and 6). Thereby, it is possible to cause the user to confirm the second factors determining the arrangement aspect and the specifications of the crane M, and thus appropriateness of a work plan including selection of the specifications of the crane M defined by the second factors, in consideration of the arrangement aspect of the first carriage points P1. Therefore, it is possible to reduce effects of how much knowledge/experience the user has and make it easy for the user to decide a work plan for the crane M.

Other Embodiments of the Present Invention

Though the device for assisting with work planning is configured with the work planning assistance server 10 in the above embodiment, the device for assisting with work planning may be configured with the information terminal 20 as another embodiment. That is, the first planning assistance processing component 11 and/or the second planning assistance processing component 12 may be configured with the terminal control device 24.

The second planning assistance processing component 12 may recognize a time series of the first carriage points P1 based on the first factors and a time series of the second factors (a time series of the arrangement aspect and/or the specifications of the crane M), generate a secondary work situation image, which is the primary work situation image with the first carriage points P1 and the second carriage points P2 being expressed in a time series in the identifiable form, and cause the secondary work situation image to be output to the terminal output interface 22.

According to the device for assisting with work planning in the above configuration, it is possible to cause the user who sees the secondary work situation image output to the terminal output interface 22 to grasp the time series of the arrangement aspect of the first carriage points P1 to which it is possible to carry the material by the crane M while avoiding interference of the crane M and the material with the building Q, with the arrangement aspect of the crane M being changing in a time series. For example, the secondary work situation image (a plurality of intermittent still images or video) in which the arrangement aspect of the first carriage points P1 and the second carriage points P2 shown in each of FIGS. 5 and 6 is changing, is output to the terminal output interface 22. Thereby, it is possible to cause the user to confirm the second factors determining the time series of the arrangement aspect and the specifications of the crane M, and thus appropriateness of a work plan defined by the second factors, in consideration of a time-series change aspect of the arrangement aspect of the first carriage points P1. Therefore, it is possible to reduce effects of how much knowledge/experience the user has and make it easy for the user to decide a work plan for the crane M.

The first planning assistance processing component 11 may generate, based on the time series of the first factors (the time series of each of the space occupation aspect of the building Q and the arrangement aspect of the plurality of candidate carriage points P), the primary work situation image indicating the time series of each of the space occupation aspect of the building Q and the arrangement aspect of the plurality of candidate carriage points P and cause the primary work situation image to be output to the terminal output interface 22. In this case, the second planning assistance processing component 12 may recognize the time series of the first carriage points P1 based on the first factors and the second factors, generate the secondary work situation image, which is the primary work situation image with the first carriage points P1 and the second carriage points P2 being expressed in a time series in the identifiable form, and cause the secondary work situation image to be output to the terminal output interface 22.

According to the device for assisting with work planning in the above configuration, it is possible to cause the user who sees the primary work situation image output to the terminal output interface 22 to grasp the time-series change aspect of the space occupation aspect of the building Q and the arrangement aspect of the candidate carriage points P. For example, a primary work situation image (a plurality of intermittent still images or video) showing that the building Q shown in each of FIGS. 3 and 4 is extended (for example, in the Z direction) according to work progress, and new candidate carriage points P appear on the extended part (furthermore, candidate carriage points P that have existed so for disappear) is output to the terminal output interface 22.

Furthermore, it is possible to cause the user who sees the secondary work situation image output to the terminal output interface 22 to grasp the time series of the arrangement aspect of the first carriage points P1 to which it is possible to carry the material by the crane M while avoiding interference of the crane M and the material with the building Q, with the space occupation aspect of the crane M being changing in a time series. For example, a secondary work situation image (a plurality of intermittent still images or video) in which the arrangement aspect of the first carriage points P1 and the second carriage points P2 changes in the process of the building Q shown in each of FIGS. 5 and 6 being extended (for example, in the Z direction) according to work progress, and new candidate carriage points P appearing on the extended part (furthermore, candidate carriage points P that have existed so for disappearing) is output to the terminal output interface 22. Therefore, it is possible to reduce effects of how much knowledge/experience the user has and make it easy for the user to decide a work plan for the crane M. The secondary work situation image shown in FIGS. 5 and 6 may include information indicating the specifications of the crane M or the time series of the specifications.

For each of the first carriage points P1, the second planning assistance processing component 12 may cause material attribute information indicating an attribute of materials that can be carried by the crane M to be output to the terminal output interface 22 in the identifiable form according to a difference in the attribute, based on the second factors.

Figure 7:
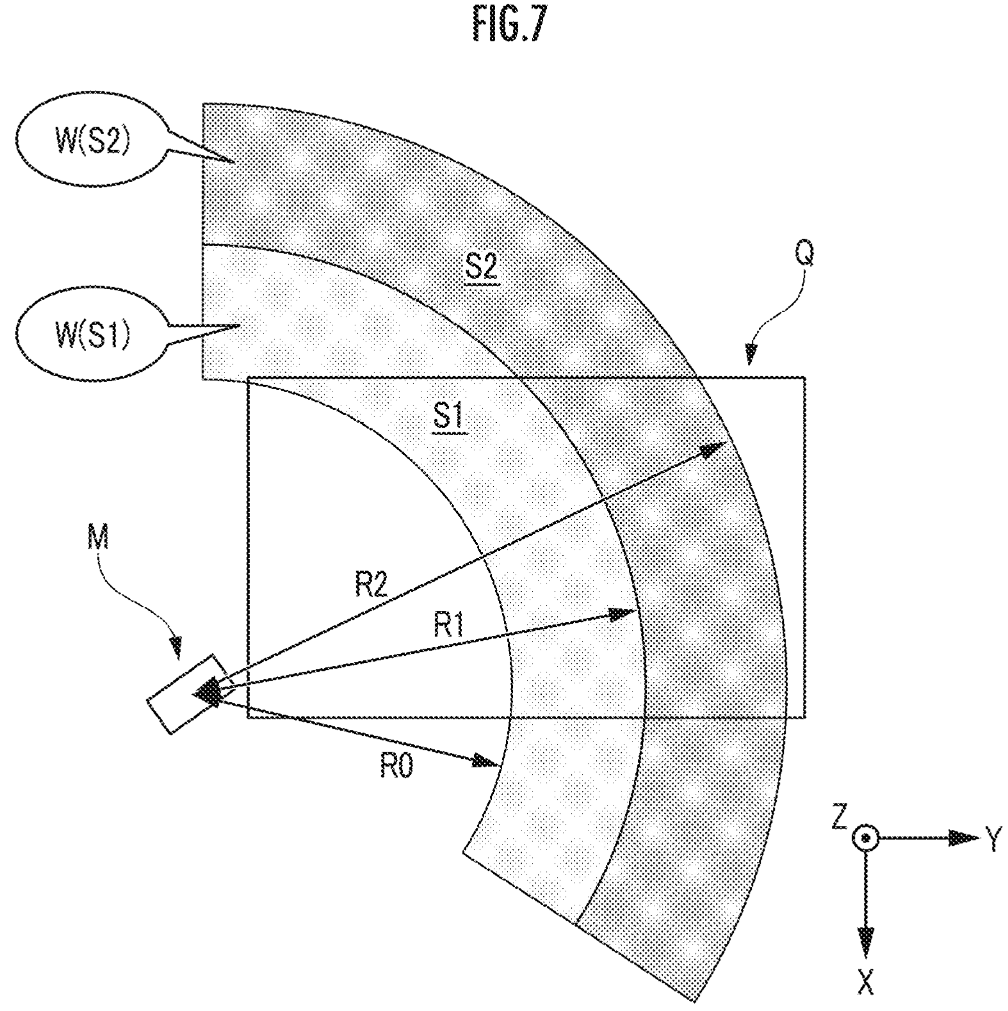
FIG. 7 is a diagram about an output aspect of material attribute information.

According to the device for assisting with work planning in the above configuration, it is possible to cause the user who sees the material attribute information output to the terminal output interface 22 to grasp, for each of the first carriage points P1, the attribute of materials that can be carried. For example, as shown in FIG. 7, a plurality of circular-arc shaped areas S1 and S2 as movement areas of the hook M22 in a state of the wire M21 extending in a vertical direction or the Z direction, corresponding to the movement range of the attachment M1 based on the crane M or the base M0 thereof, and weights W(S1) and W(S2) (furthermore, shapes and sizes) of materials that can be carried in the inner circular-arc shaped area S1 and the outer circular-arc shaped area S2, respectively, are output to the terminal output interface 22. An inner diameter R0 and an outer diameter R1 of the inner circular-arc shaped area S1 are geometrically determined based on the tolerance range of the elevation angle θ1 of the boom M11 and the tolerance range of the elevation angle θ2 of the jib M12 that are determined according to the material weight W (S1). An inner diameter R1 and an outer diameter R2 of the outer circular-arc shaped area S2 are geometrically determined based on the tolerance range of the elevation angle θ1 of the boom M11 and the tolerance range of the elevation angle θ2 of the jib M12 that are determined according to the material weight W(S2)(<W(S1)).

Thereby, it is possible to cause the user to confirm the second factors determining the arrangement aspect and the specifications of the crane M, and thus appropriateness of a work plan defined by the second factors, in consideration of the arrangement aspect of the first carriage points P1. Therefore, it is possible to reduce effects of how much knowledge/experience the user has and make it easy for the user to decide a work plan for the crane M.

The second planning assistance processing component 12 may partially restrict an aspect of specifying the second factors through the terminal input interface 21, based on the first factors further determining the attribute of the material.

Figure 8:
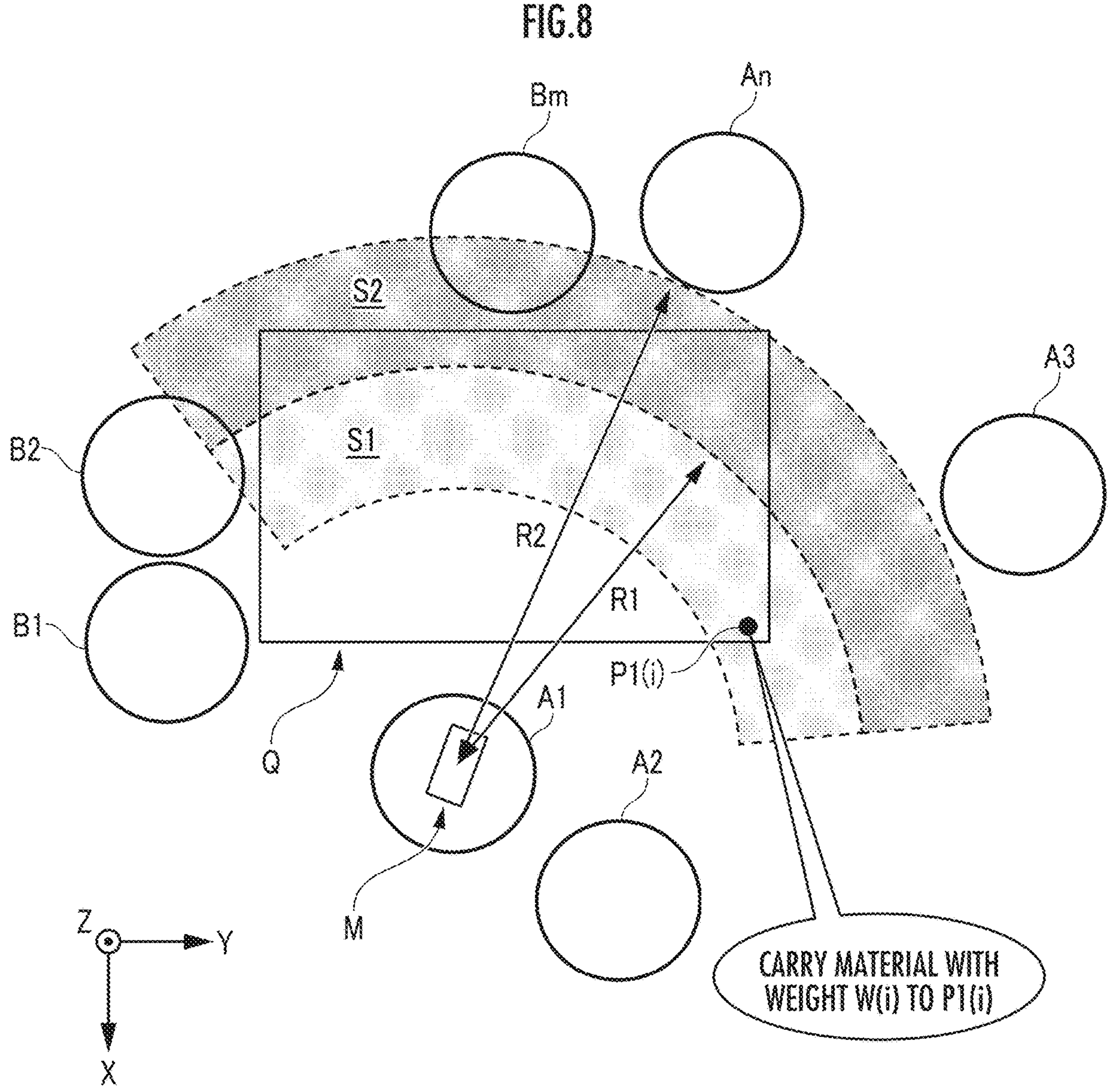
FIG. 8 is a diagram about an aspect of restricting specification of second factors.

According to the device for assisting with work planning in the above configuration, the second factors that can be specified through the terminal input interface 21, and thus the arrangement aspect and/or the specifications of the crane M determined according to the second factors are restricted in consideration of the attribute of the material to be carried. For example, when a material with a weight W(i)(W(S2) <W(i)≤W(S1)) is carried to a first carriage point P1(*i*) shown in FIG. 8, specification of such second factors that the base M0 is arranged at any of candidate arrangement points B1, B2, . . . , Bm corresponding to arrangement points of the base M0 with which the inner circular-arc shaped area S1 shown in FIG. 7 does not overlap is prohibited. On the other hand, specification of such second factors that the base M0 is arranged at any of candidate arrangement points A1, A2, . . . , Am corresponding to arrangement points of the base M0 with which the inner circular-arc shaped area S1 shown in FIG. 7 overlaps is allowed. Thereby, it is avoided that such unreasonable work planning assistance information that the performance of the crane M is exceeded is generated. Therefore, it is possible to reduce effects of how much knowledge/experience the user has and make it easy for the user to decide a work plan for the crane M.

The second planning assistance processing component 12 may recognize the first carriage points P1 based on the first factors, the second factors, and external factors that affect a situation of carriage of the material by the crane M.

According to the device for assisting with work planning in the above configuration, it is possible to cause the user who sees the secondary work situation image output to the terminal output interface 22 to grasp the arrangement aspect of the first carriage points P1 to which it is possible to carry the material by the crane M while avoiding interference of the crane M and the material with the building Q, in consideration of the external factors that affect the situation of carriage of the material by the crane M. The "external factors" include the tolerance range of the height above sea level of the highest reaching part of the crane M a geographical area were the base M0 of the crane M can be arranged, weather conditions (presence/absence of rainfall/snowfall, an amount of rain/snow, presence/absence of freezing, and the like) determining the geographical area, and/or a direction of and speed of wind to the crane M and the material. Thereby, it is possible to cause the user to confirm appropriateness of a work plan defined by the second factors for which the effects of the external factors are considered, in consideration of the arrangement aspect of the first carriage points P1. Therefore, it is possible to reduce effects of how much knowledge/experience the user has and make it easy for the user to decide a work plan for the crane M.

The second planning assistance processing component 12 may recognize the time series of the first carriage points P1 based on a time series of the external factors, generate the secondary work situation image, which is the primary work situation image with the first carriage points P1 and the second carriage points P2 being expressed in a time series in the identifiable form, and cause the secondary work situation image to be output to the terminal output interface 22.

According to device for assisting with work planning in the above configuration, it is possible to cause the user who sees the secondary work situation image output to the terminal output interface 22 to grasp the time series of the first carriage points P1 to which it is possible to carry the material by the crane M while avoiding interference of the crane M and the material with the building Q, in a situation in which the external factors are changing in a time series. Thereby, it is possible to cause the user to confirm appropriateness of a work plan defined by the second factors for which the effects of the external factors are considered, in consideration of the time-series change aspect of the arrangement aspect of the first carriage points P1. Therefore, it is possible to reduce effects of how much knowledge/experience the user has and make it easy for the user to decide a work plan for the crane M.

In the device for assisting with work planning in the above configuration, it is preferable that the second planning assistance processing component recognizes the first carriage points based on the first factors, the second factors, and external factors that affect a situation of carriage of the material by the crane.

According to device for assisting with work planning in the above configuration, it is possible to cause the user who sees the secondary work situation image output to the output interface to grasp the arrangement aspect of the first carriage points to which it is possible to carry the material by the crane while avoiding interference of the crane and the material with the building, in consideration of the external factors that affect the situation of carriage of the material by the crane. Thereby, it is possible to cause the user to confirm appropriateness of a work plan defined by the second factors for which the effects of the external factors are considered, in consideration of the arrangement aspect of the first carriage points. Therefore, it is possible to reduce effects of how much knowledge/experience the user has and make it easy for the user to decide a work plan for the crane.

In the device for assisting with work planning in the above configuration, it is preferable that the second planning assistance processing component recognizes the time series of the first carriage points based on the time series of the external factors, generates the secondary work situation image, the secondary work situation image being the primary work situation image with the first carriage points and the second carriage points being expressed in a time series in the identifiable form, and causes the secondary work situation image to be output to the output interface.

According to the device for assisting with work planning in the above configuration, it is possible to cause the user who sees the secondary work situation image output to the output interface to grasp the time series of the arrangement aspect of the first carriage points to which it is possible to carry the material by the crane while avoiding interference of the crane and the material with the building, in a situation in which the external factors are changing in a time series. Thereby, it is possible to cause the user to confirm appropriateness of a work plan defined by the second factors for which the effects of the external factors are considered, in consideration of the time-series change aspect of the arrangement aspect of the first carriage points. Therefore, it is possible to reduce effects of how much knowledge/experience the user has and make it easy for the user to decide a work plan for the crane.

In the device for assisting with work planning in the above configuration, it is preferable that the second planning assistance processing component recognizes the time series of the first carriage points based on the time series of the second factors, generates the secondary work situation image, the secondary work situation image being the primary work situation image with the first carriage points and the second carriage points being expressed in a time series in the identifiable form, and causes the secondary work situation image to be output to the output interface.

According to the device for assisting with work planning in the above configuration, it is possible to cause the user who sees the secondary work situation image output to the output interface to grasp the time series of the arrangement aspect of the first carriage points to which it is possible to carry the material by the crane while avoiding interference of the crane and the material with the building, with the arrangement aspect of the crane being changing in a time series. Thereby, it is possible to cause the user to confirm the time series of the arrangement aspect and/or the specifications of the crane determined by the second factors, and thus appropriateness of a work plan defined by the second factors, in consideration of the time-series change aspect of the arrangement aspect of the first carriage points. Therefore, it is possible to reduce effects of how much knowledge/experience the user has and make it easy for the user to decide a work plan for the crane.

In the device for assisting with work planning in the above configuration, it is preferable that, based on the time series of the first factors, the first planning assistance processing component generates the primary work situation image indicating the time series of each of the space occupation aspect of the building and the arrangement aspect of the plurality of candidate carriage points and causes the primary work situation image to be output to the output interface, and the second planning assistance processing component recognizes the time series of the first carriage points based on the time series of the first factors, generates the secondary work situation image, the secondary work situation image being the primary work situation image with the first carriage points and the second carriage points being expressed in a time series in the identifiable form, and causes the secondary work situation image to be output to the output interface.

According to the device for assisting with work planning in the above configuration, it is possible to cause the user who sees the primary work situation image output to the output interface to grasp the time-series change aspect of the space occupation aspect of the building and the arrangement aspect of the candidate carriage points. Furthermore, it is possible to cause the user who sees the secondary work situation image output to the output interface to grasp the time series of the arrangement aspect of the first carriage points to which it is possible to carry the material by the crane while avoiding interference of the crane and the material with the building, with the space occupation aspect of the crane being changing in a time series. Therefore, it is possible to reduce effects of how much knowledge/experience the user has and make it easy for the user to decide a work plan for the crane.

In the device for assisting with work planning in the above configuration, it is preferable that, for each of the first carriage points, the second planning assistance processing component causes material attribute information indicating an attribute of materials that can be carried by the crane to be output to the output interface in the identifiable form according to a difference in the attribute, based on the second factors.

According to the device for assisting with work planning in the above configuration, it is possible to cause the user who sees the material attribute information output to the output interface to grasp, for each of the first carriage points, the attribute of materials that can be carried. Thereby, it is possible to cause the user to confirm the second factors determining the arrangement aspect and the specifications of the crane, and thus appropriateness of a work plan defined by the second factors, in consideration of the arrangement aspect of the first carriage points. Therefore, it is possible to reduce effects of how much knowledge/experience the user has and make it easy for the user to decide a work plan for the crane.

In the device for assisting with work planning in the above configuration, it is preferable that the second planning assistance processing component partially restricts an aspect of specifying the second factors through the input interface, based on the first factors further determining the attribute of the material.

According to the device for assisting with work planning in the above configuration, the second factors that can be specified through the input interface, and thus the arrangement aspect and/or the specifications of the crane determined according to the second factors are restricted in consideration of the attribute of a material to be carried. Thereby, it is avoided that such unreasonable work planning assistance information that the performance of the crane is exceeded is generated. Therefore, it is possible to reduce effects of how much knowledge/experience the user has and make it easy for the user to decide a work plan for the crane.

REFERENCE SIGNS LIST

10 work planning assistance server (device for assisting with work planning)
11 first planning assistance processing component
12 second planning assistance processing component
20 information terminal
21 terminal input interface
22 terminal output interface
An candidate arrangement point
Bm candidate arrangement point
M crane
M0 base
M1 attachment
M11 boom
M12 jib
M21 wire
M22 hook
P candidate carriage point
P1 first carriage point
P2 second carriage point

The invention claimed is:

1. A device for assisting with work planning, the device comprising:

a first planning assistance processing component configured to, based on first factors defining a space occupation aspect of a building and an arrangement aspect of a plurality of candidate carriage points, the first factors being specified through an input interface of an information terminal of a user, generate a primary work situation image indicating the space occupation aspect of the building and the arrangement aspect of the plurality of candidate carriage points and cause the primary work situation image to be output to an output interface of the information terminal carried by the user so that the candidate carriage points designated for carrying to or from the building are arranged within the building; and a second planning assistance processing component configured to, based on second factors determining an arrangement aspect and specifications of a crane for carrying a material, the second factors being specified through the input interface, in addition to the first factors, recognize candidate carriage points to which it is possible to carry the material by the crane while avoiding interference of each of the crane and the material with the building as first carriage points among the plurality of candidate carriage points, generate a secondary work situation image, the secondary work situation image being the primary work situation image with the first carriage points and second carriage points, which are candidate carriage points other than the first carriage points among the plurality of candidate carriage points, being expressed in an identifiable form, and cause the secondary work situation image to be output to the output interface so that among the plurality of candidate carriage points, the first carriage points, to or from which the material is to be carried by the crane in view of the material, the crane, and the building, are identified and the second carriage points are those other than the first carriage points, wherein both the first and second planning assistance processing components operate to provide the primary and secondary work situation images to be output on the output interface simultaneously as work planning assistance information before starting an actual work at a site, wherein the second planning assistance processing component recognizes the first carriage points based on the first factors, the second factors, and external factors that affect a situation of carriage of the material by the crane, the external factors including a tolerance range of a height above sea level of a highest reaching part of the crane and a geographical area where a base of the crane can be arranged, wherein the second planning assistance processing component determines a range possible to carry the material according to the specifications of the crane and a weight of the material to be carried and outputs the range to the output interface together with the secondary work situation image, and wherein the primary work situation image, the second work situation image and the range possible to carry the material enable the user to decide a work plan for the crane regardless of an experience level of the user.

2. The device for assisting with work planning according to claim 1, wherein the second planning assistance processing component recognizes a time series of the first carriage points based on a time series of the external factors, generates the secondary work situation image, the secondary work situation image being the primary work situation image with the first carriage points and the second carriage points being expressed in a time series in the identifiable form, and causes the secondary work situation image to be output to the output interface.

3. The device for assisting with work planning according to claim 1, wherein the second planning assistance processing component recognizes the time series of the first carriage points based on a time series of the second factors, generates the secondary work situation image, the secondary work situation image being the primary work situation image with the first carriage points and the second carriage points being expressed in a time series in the identifiable form, and causes the secondary work situation image to be output to the output interface.

4. The device for assisting with work planning according to claim 1, wherein the first planning assistance processing component generates, based on the time series of the first factors, the primary work situation image indicating a time series of each of the space occupation aspect of the building and the arrangement aspect of the plurality of candidate carriage points and causes the primary work situation image to be output to the output interface; and the second planning assistance processing component recognizes a time series of the first carriage points based on the time series of the first factors, generates the secondary work situation image, the secondary work situation image being the primary work situation image with the first carriage points and the second carriage points being expressed in a time series in the identifiable form, and causes the secondary work situation image to be output to the output interface.

5. The device for assisting with work planning according to claim 1, wherein for each of the first carriage points, the second planning assistance processing component causes material attribute information indicating an attribute of materials that can be carried by the crane to be output to the output interface in an identifiable form according to a difference in the attribute, based on the second factors.

6. The device for assisting with work planning according to claim 1, wherein the second planning assistance processing component partially restricts an aspect of specifying the second factors through the input interface, based on the first factors further determining the attribute of the material.

7. A method for assisting with work planning, the method comprising a first planning assistance process and a second planning assistance process, wherein the first planning assistance process comprises:

a process for, based on first factors defining a space occupation aspect of a building and an arrangement aspect of a plurality of candidate carriage points, the first factors being specified through an input interface of an information terminal of a user, generating a primary work situation image indicating the space occupation aspect of the building and the arrangement aspect of the plurality of candidate carriage points and causing the primary work situation image to be output to an output interface of the information terminal of the user so that the candidate carriage points designated for carrying to or from the building are arranged within the building; and the second planning assistance process comprises:

a process for, based on second factors determining an arrangement aspect and specifications of a crane for carrying a material, the second factors being specified through the input interface, in addition to the first factors, recognizing candidate carriage points to which it is possible to carry the material by the crane while avoiding interference of each of the crane and the material with the building as first carriage points among the plurality of candidate carriage points;

a process for generating a secondary work situation image, the secondary work situation image being the primary work situation image with the first carriage points and second carriage points, which are candidate carriage points other than the first carriage points among the plurality of candidate carriage points, being expressed in an identifiable form, and causing the secondary work situation image to be output to the output interface so that among the plurality of candidate carriage points, the first carriage points, to or from which the material is to be carried by the crane in view of the material, the crane, and the building, are identified and the second carriage points are those other than the first carriage points; and a process determining a range possible to carry the material according to the specifications of the crane and a weight of the material to be carried and outputting the range to the output interface together with the secondary work situation image, wherein both the primary and secondary work situation images are provided to be output on the output interface simultaneously as work planning assistance information before starting an actual work at a site, wherein the first carriage points are recognized based on the first factors, the second factors, and external factors that affect a situation of carriage of the material by the crane, the external factors including a tolerance range of a height above sea level of a highest reaching part of the crane and a geographical area where a base of the crane can be arranged, wherein the primary work situation image, the second work situation image and the range possible to carry the material enable the user to decide a work plan for the crane regardless of an experience level of the user.

* * * * *